United States Patent
Kim

(10) Patent No.: US 6,941,618 B2
(45) Date of Patent: Sep. 13, 2005

(54) HINGE DEVICE FOR PORTABLE WIRELESS TERMINAL

(75) Inventor: Si-Wan Kim, Anyang-shi (KR)

(73) Assignees: Samsung Electronics Co., Ltd. (KR); M2Sys Co., Ltd. (KR)

(*) Notice: Subject to any disclaimer, the term of this patent is extended or adjusted under 35 U.S.C. 154(b) by 3 days.

(21) Appl. No.: 10/655,931

(22) Filed: Sep. 4, 2003

(65) Prior Publication Data

US 2004/0049884 A1 Mar. 18, 2004

(30) Foreign Application Priority Data

| Sep. 13, 2002 | (KR) | 10-2002-0055826 |
| Sep. 14, 2002 | (KR) | 10-2002-0055976 |
| Mar. 28, 2003 | (KR) | 10-2003-0019476 |
| Aug. 30, 2003 | (KR) | 10-2003-0060632 |

(51) Int. Cl.⁷ ........................... E05C 17/64; E05D 11/08; E05D 3/10

(52) U.S. Cl. ............................. 16/337; 16/334; 16/367; 16/382; 379/433.5; 348/373; 455/575.1; 455/575.3

(58) Field of Search ........................... 16/337, 334–336, 16/332, 367, 366, 342, 382; 379/433.1, 433.2, 433.3, 433.4, 433.5; 361/680, 681, 682–683; 248/917, 919, 920, 921; 348/373; 455/556.1, 550.1, 575.1, 575.3

(56) References Cited

U.S. PATENT DOCUMENTS

| 5,335,142 A | * | 8/1994 | Anderson | 361/681 |
| 6,256,837 B1 | * | 7/2001 | Lan et al. | 16/334 |
| 6,694,569 B2 | * | 2/2004 | Chien et al. | 16/367 |
| 6,694,570 B2 | * | 2/2004 | Chen | 16/367 |
| 6,742,221 B2 | * | 6/2004 | Lu et al. | 16/367 |
| 6,742,756 B1 | * | 6/2004 | Fimeri et al. | 248/479 |
| 6,804,861 B2 | * | 10/2004 | Hsu | 16/366 |
| 2001/0004269 A1 | | 6/2001 | Shibata et al. | |
| 2004/0082202 A1 | * | 4/2004 | Obermeyer | 439/6 |
| 2004/0139579 A1 | * | 7/2004 | Su | 16/351 |
| 2004/0196403 A1 | * | 10/2004 | Lee | 348/373 |

FOREIGN PATENT DOCUMENTS

| EP | 1 207 671 A2 | | 5/2002 | |
| JP | 10-290385 | | 10/1998 | |
| JP | 11257343 A | * | 9/1999 | F16C/11/10 |
| JP | 2000240636 | | 9/2000 | |
| JP | 2001227229 | | 8/2001 | |
| JP | 2001251406 | | 9/2001 | |
| JP | 2002135380 | | 5/2002 | |
| JP | 2003120652 A | * | 4/2003 | F16C/11/04 |
| JP | 2004053927 A | * | 2/2004 | G09F/9/00 |

* cited by examiner

*Primary Examiner*—Chuck Y. Mah
(74) *Attorney, Agent, or Firm*—Dilworth & Barrese LLP

(57) ABSTRACT

Disclosed is a hinge device of a portable wireless terminal. The portable wireless terminal includes a first housing, a second housing rotatably coupled to the first housing in such a manner that the second housing moves away from the first housing or approaches the first housing according to a rotational movement thereof, a first hinge axis extending parallel to an upper surface of the first housing, and a second hinge axis extending perpendicular to the upper surface of the first housing and providing a rotational center for the first hinge axis. The first and second hinge axes act as rotational axes of the second housing when the second housing rotates with respect to the first housing. The hinge device has a first hinge module including a first hinge base fixedly coupled to the first housing, and a second hinge base rotatably coupled to the first hinge base in opposition to the first hinge base so as to be rotated about the second hinge axis, and a second hinge module fixed to the second housing and connecting the second housing to the second hinge base in order to allow the second housing to rotate about the first hinge axis.

16 Claims, 13 Drawing Sheets

HINGE DEVICE FOR PORTABLE WIRELESS TERMINAL

PRIORITY

This application claims priority to applications entitled "Hinge Device For Portable Wireless Terminal" filed in the Korean Industrial Property Office on Sep. 13, 2002, Sep. 14, 2002, Mar. 28, 2003, and Aug. 30, 2003 and assigned Ser. Nos. 2002-55826, 2002-55976, 2003-19476, and 2003-60632, respectively, the contents of which are hereby incorporated by reference.

BACKGROUND OF THE INVENTION

1. Field of the Invention

The present invention relates to a portable wireless terminal, and more particularly to a hinge device of a portable wireless terminal for allowing a housing of the portable wireless terminal to be rotated about two hinge axes.

2. Description of the Related Art

Generally, portable wireless terminals are devices which allow a user to communicate with other users in a wireless manner. Such portable wireless terminals are classified into bar-type, flip-type and folder-type terminals according to the external appearance thereof. The bar-type terminal includes a single housing having a bar-shape. The flip-type terminal includes a flip or a cover rotatably coupled to a bar-type housing by means of a hinge device. The folder-type terminal includes a folder rotatably and foldably coupled to a single bar-type housing by means of a hinge device.

In addition, such wireless terminals can be classified into rotation-type terminals and sliding-type terminals according to the operating manner of a folder or a housing. The rotation-type terminal includes two housings, which are aligned in opposition to each other and rotatably coupled to each other. The sliding-type terminal includes two housings aligned in opposition to each other, in which one housing can be slidably moved lengthwise with respect to the other housing.

The above-mentioned portable wireless terminals are well known to those skilled in the art, and typically include an antenna device, a data input/output device, and a data transmitting/receiving device. Generally, a key pad allowing a user to input data by pushing the key pad with his/her fingers is mainly used as a data input device. A touch pad or a touch screen also can be used as a data input/output device. In addition, an LCD is mainly used as a data output device, i.e. a display.

The key pad used for inputting data includes a plurality of keys generally consisting of number keys, character keys, a send key, an end key, and a function key. In addition, fifteen to twenty keys are aligned on an upper surface of a housing of the portable wireless terminal. Of course, such keys are exposed to the upper surface of the housing so that a user can input data by pushing keys using his/her fingers. In addition, the portable wireless terminal may include a photographing device, such as a lens, for image communication. The user can make such image communication with other users or can photograph an object by using the photographing device.

Recently, users' tastes for portable wireless terminals have become diversified, and users' demands for information has increased remarkably. However, although various kinds of additional devices, such as a camera lens or a camcorder, have been added to portable wireless terminals, the display device for data output is usually fixedly installed or rotated in one direction in such a portable wireless terminal, thereby causing inconvenience when photographing an object or making an image communication with other users. In order to solve the above problem, various terminals having new design concepts have been suggested. However, implementation of the new designs for the new terminals in commercial use has not yet occurred.

SUMMARY OF THE INVENTION

Accordingly, the present invention has been made to solve the above-mentioned problems occurring in the prior art, and an object of the present invention is to provide a hinge device of a portable wireless terminal adapted to various tastes and demand of users.

Another object of the present invention is to provide a hinge device of a portable wireless terminal, capable of properly adjusting a photographing direction of a camera lens and an image displaying direction of a display device, thereby improving convenience of use.

In order to accomplish this object, there is provided a hinge device of a portable wireless terminal which includes a first housing and a second housing, the first housing having a first hinge axis extending parallel to an upper surface of the first housing, the second housing being rotatably coupled to the first housing in such a manner that the second housing moves away from the first housing or approaches the first housing as a result of rotational movement thereof, the second housing having a second hinge axis extending perpendicular to the upper surface of the first housing, the second hinge axis providing a rotational center for the first hinge axis, the first and second hinge axes acting as rotational axes of the second housing when the second housing rotates with respect to the first housing, the hinge device comprising: a first hinge module including a first hinge base fixedly coupled to the first housing, and a second hinge base rotatably coupled to the first hinge base in opposition to the first hinge base so as to be rotated about the second hinge axis; and a second hinge module fixed to the second housing and connecting the second housing to the second hinge base in order to allow the second housing to rotate about the first hinge axis.

BRIEF DESCRIPTION OF THE DRAWINGS

The above objects and other features and advantages of the present invention will be more apparent from the following detailed description taken in conjunction with the accompanying drawings, in which.

DETAILED DESCRIPTION OF THE PREFERRED EMBODIMENT

Figure 1:
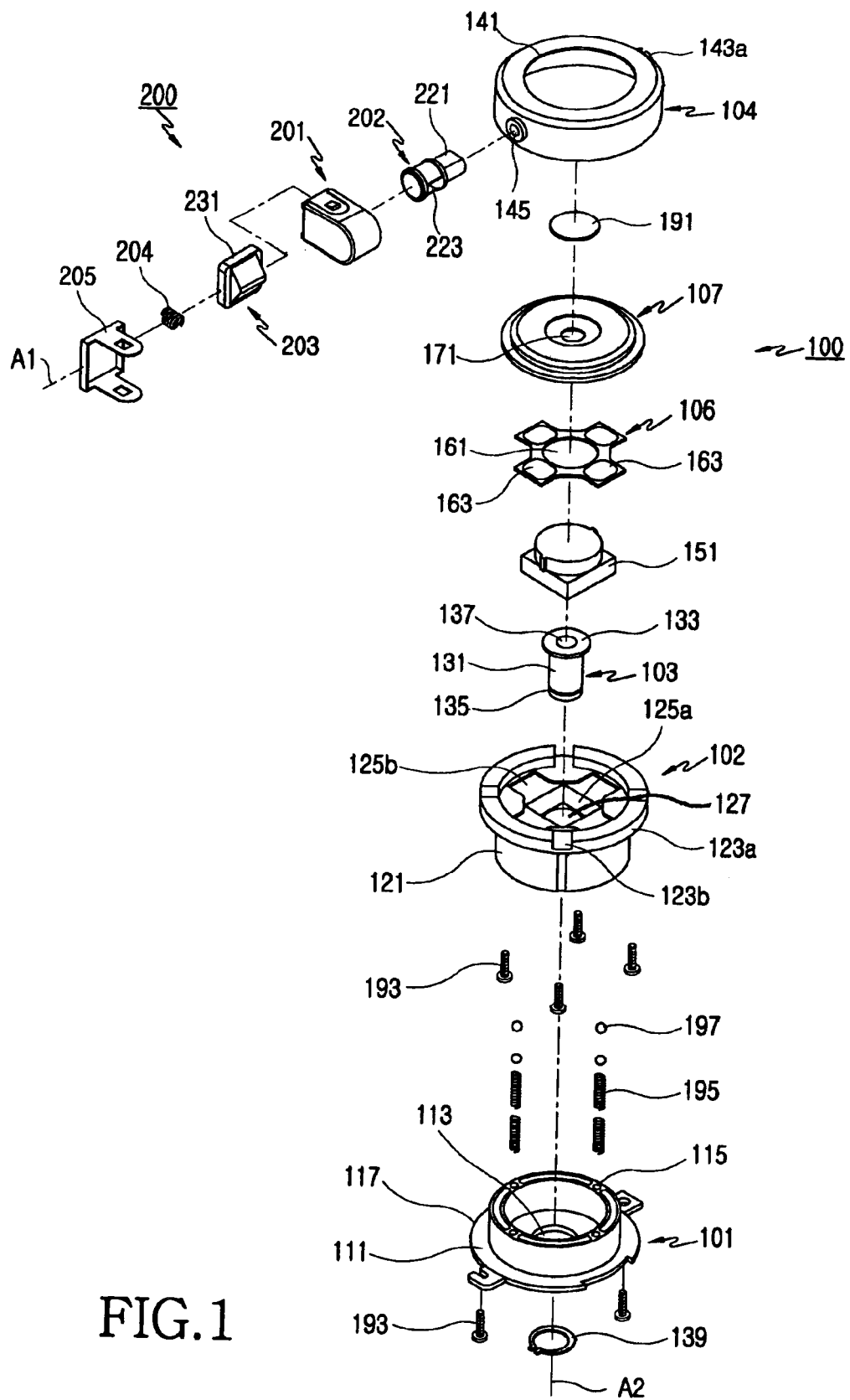
FIG. 1 is an exploded perspective view showing a hinge device of a portable wireless terminal according to a first embodiment of the present invention.

Hereinafter, a preferred embodiment of the present invention will be described with reference to the accompanying drawings. In the following description of the present invention, the same reference numerals are used to designate the same or similar components and a detailed description of known functions and configurations incorporated herein will be omitted when it may make the subject matter of the present invention rather unclear.

Figure 6:
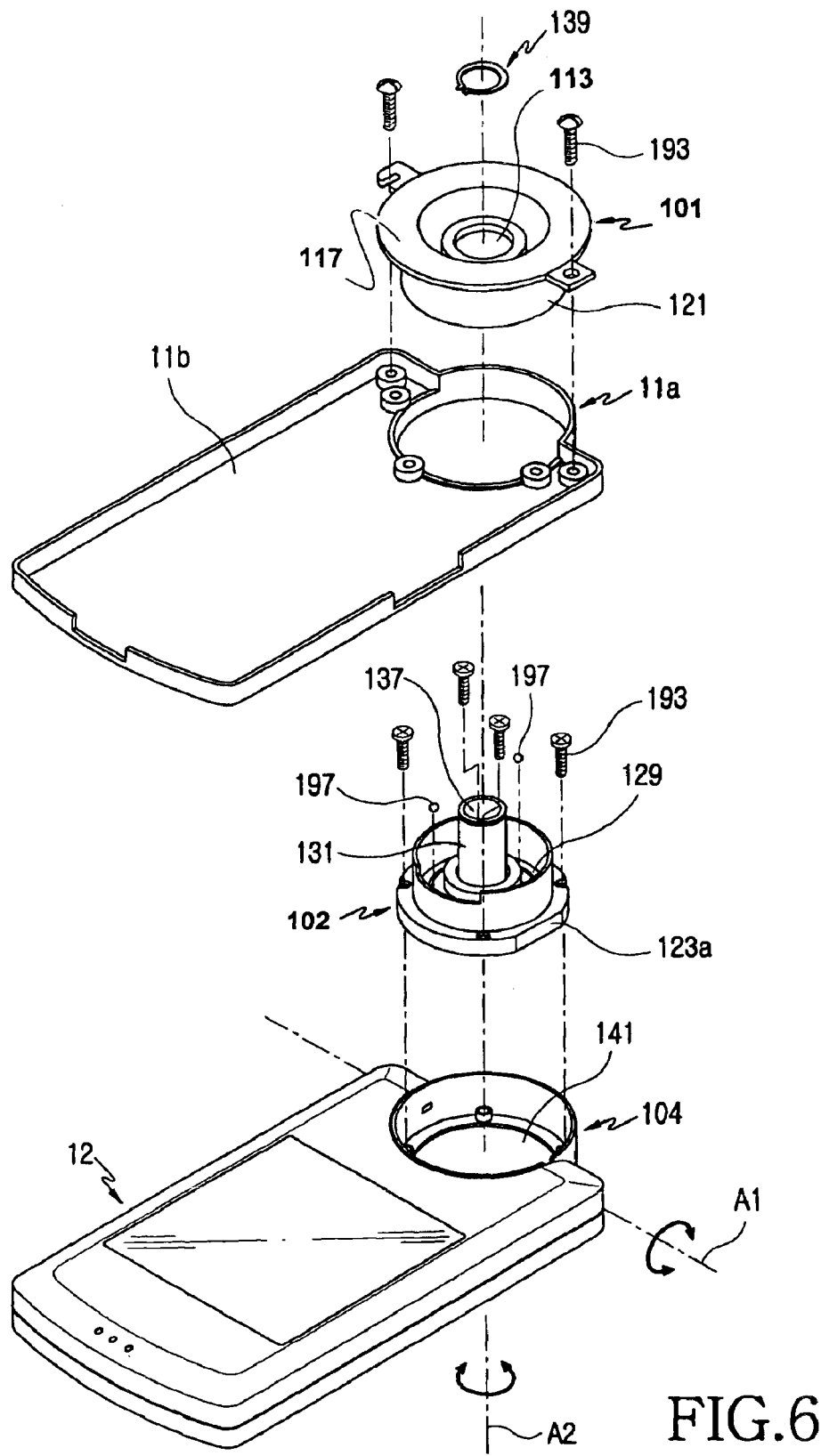
FIG. 6 is a perspective view showing the hinge device of FIG. 1 being assembled into a portable wireless terminal.
Figure 7:
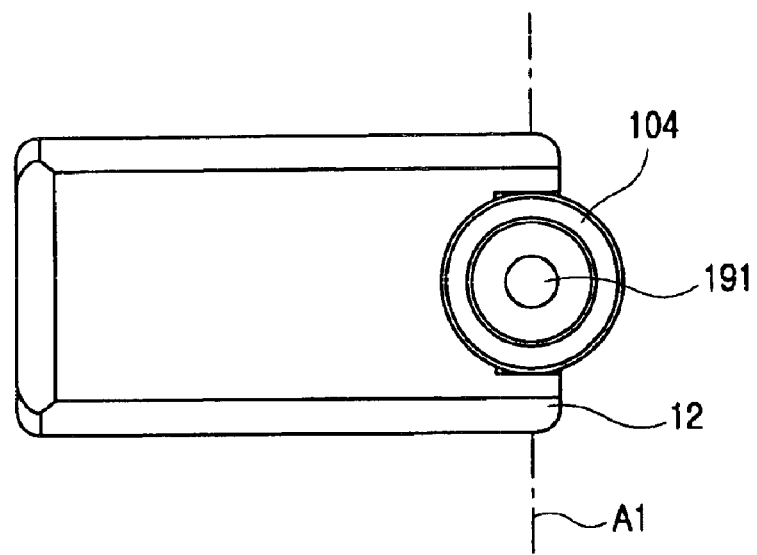
FIGS. 7 to 14 are plan views showing an opening/closing operation of a portable wireless terminal having the hinge device shown in FIG. 1.
Figure 8:
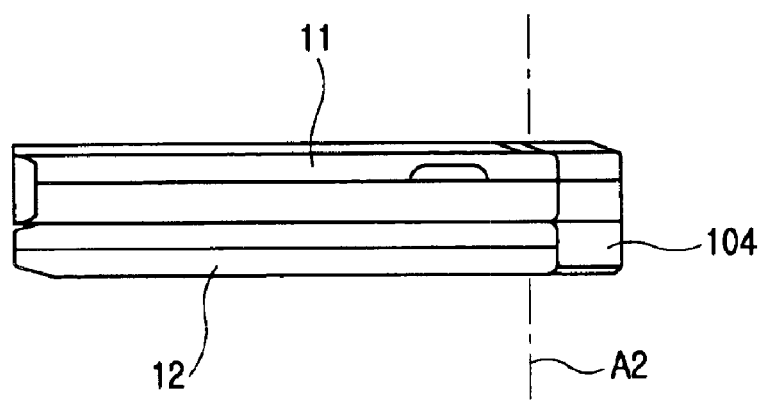

Referring to FIGS. 1 to 6, a hinge device of a portable wireless terminal according to a first embodiment of the present invention includes a first hinge module 100 having first and second hinge bases 101 and 102, which are aligned in opposition to each other and rotatably coupled to each other to provide a second hinge axis A2, and a second hinge module 200 rotatably coupled to the first hinge module 100 to provide a first hinge axis A1. The hinge device foldably couples a first housing 11 (as shown in FIG. 8) of the portable wireless terminal to a second housing 12 (also shown in FIG. 8), which is aligned in opposition to the first housing 11 in such a manner that the second housing 12 can be rotated about two axes with respect to the first housing 11. The first hinge axis Al extends parallel to an upper surface of the first housing 11 (FIG. 7). The second housing 12 is rotated about the first hinge axis A1 so that the second housing 12 moves away from the first housing 11 or approaches the first housing 11 according to a rotational movement thereof. The second hinge axis A2 extends perpendicular to the upper surface of the first housing 11 (FIG. 8). Thus, the second hinge axis A2 extends perpendicular to the first hinge axis A1 and the first hinge axis A1 is rotated about the second hinge axis A2. The second housing 12 is rotated about the second hinge axis A2 in opposition to the first housing 11.

The first hinge base 101 is fixed to an inner portion of the first housing 11 preferably adjacent to one end of the first housing 11. An upper end of the first hinge base 101 protrudes to the upper surface of the first housing 11. The first hinge base 101 includes a cylindrical body 111 having a first perforation hole 113 extending in a direction of the second hinge axis A2, and a rib 117 outwardly protruding from a lower outer wall of the cylindrical body 111 and formed at a circumferential portion thereof with at least one coupling hole. The hinge base 101 is coupled to the inner portion of the first housing 11 by means of a coupling device, such as a screw 193. An upper end of the cylindrical body 111 is exposed to the upper surface of the first housing 11 and formed with at least one spring hole 115. The spring holes 115 are aligned along an upper circumferential part of the cylindrical body 111 at the same angular interval. A compression spring 195 is accommodated in each spring hole 115, and a ball 197 is mounted on an end of the compression spring 195. The ball 197 is held at an end of the spring hole 115 by receiving elastic force from the compression spring 195. The ball 197 slidably moves along an inner surface of the second hinge base 102. Thus, it is preferable to form the spring holes 115 symmetrically to each other such that elastic force is uniformly applied to the ball 197.

The second hinge base 102 includes a rotating member 121 having an opened lower end and a partially opened upper end. The rotating member 121 has a second perforation hole 127 extending in a direction of the second hinge axis A2. The first hinge base 101 is assembled into the opened lower end of the second hinge base 102. In this state, the first perforation hole 113 is coaxially aligned with the second perforation hole 127. That is, when the first hinge base 101 is assembled with the second hinge base 102, the first perforation hole 113 is aligned in line with the second perforation hole 127. A coupling part 123a outwardly protrudes along a circumferential portion of the partially opened upper end of the second hinge base 102. The coupling part 123a has at least one coupling hole 123b acting as a coupling device.

Slots (not shown) having predetermined depth and a shape corresponding to a shape of the ball 197 are formed along an inner circumferential portion of the partially opened upper end of the second hinge base 102 at the same angular interval. Rotation of the second hinge base 102 is stopped at a position, in which the balls 197 face the slots. That is, the balls 197 engage the slots due to elastic force of the compression springs 195, so that rotation of the second hinge base 102 is stopped.

The hinge device has a hinge coupler 103 including a flange 133 installed on an upper end of the second hinge base 102, a supporting shaft 131 protruding from the flange 133 in a direction of the second hinge axis A2 and extending through the first and second perforation holes 113 and 127, and a coupling slot 135 formed along an outer circumferential portion of the supporting shaft 131. The coupling slot 135 is coupled to a snap ring 139 at a lower end of the first hinge base 101, so that the first hinge base 101 is rotatably coupled to the second hinge base 102 in opposition to each other by means of the hinge coupler 103.

In addition, receiving grooves are formed on the upper portion of the second hinge base 102. The receiving grooves includes a first receiving groove 125a for receiving a camera lens 151 therein and second receiving groove 125b for receiving a switch pad 106 therein. The second receiving groove 125b has depth shallower than depth of the first receiving groove 125a. According to another embodiment of the present invention, it is possible to form only one groove for receiving the camera lens 151 or a key pad. In order to make an electric connection between the camera lens 151 or the key pads and an RF board (not shown) accommodated in the first housing 11, a guide hole 137 extending in a direction of the second hinge axis A2 can be formed in the hinge coupler 103 to provide a path for a flexible printed circuit. The key pad includes the switch pad 106 having at least one pair of dome switches 163, which are symmetrically aligned to each other, and a first opening 161 for exposing the camera lens 151, and a key button 107 for operating the dome switches 163. The key button 107 has a second opening 171 aligned with the first opening 161 for exposing the camera lens 151. In order to prevent the camera lens 151 and the key pads from being contaminated, the second opening 171 is covered with a transparent window 191.

The second housing 12 is coupled to the second hinge base 102 such that the second housing 12 can be rotated about the first hinge axis A1. At this time, a rotary hinge housing 104 can be interposed between the second housing 12 and the second hinge base 102 as a coupling device.

The rotary hinge housing 104 has a cylindrical shape. A coupling hole 145 is formed at one outer peripheral surface of the rotary hinge housing 104 and a hinge dummy 143a extends from the other outer peripheral surface of the rotary hinge housing 104. The coupling hole 145 and the hinge dummy 143a are positioned in the first hinge axis A1. The hinge dummy 143a is formed at an end thereof with a dummy hole 143b extending through an inner peripheral surface of the rotary hinge housing 104. A flexible printed circuit (not shown) can be aligned through the dummy hole 143b for an electric connection between electric circuits accommodated in the first and second housings 11 and 12.

A coupling member 149 is provided at an inner portion of one end of the rotary hinge housing 104 so as to couple the second hinge base 102 to the rotary hinge housing 104. The key button 107 and the window 191 formed on the upper end of the second hinge base 102 are exposed to an exterior through an opening 141 formed at the end of the rotary hinge housing 104. The rotary hinge housing 104 is rotatably inserted into a semi-circular opening formed at one end of the second housing 12, as shown in FIG. 6. The rotary hinge housing 104 can also be integrally formed with the second hinge base 102.

Figure 2:
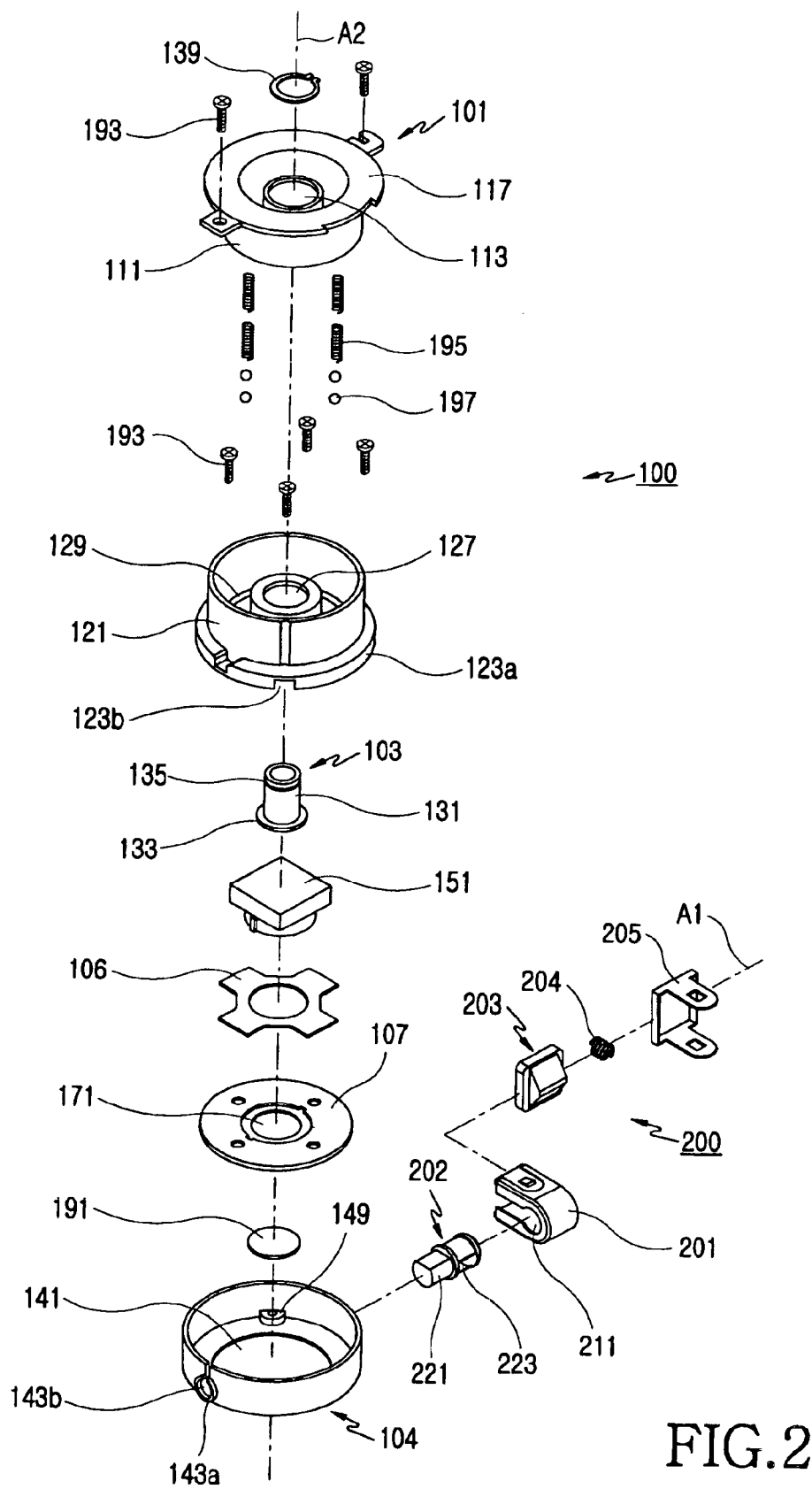
FIG. 2 is an exploded perspective view of the hinge device viewed from an inverted direction of FIG. 1.
Figure 3:
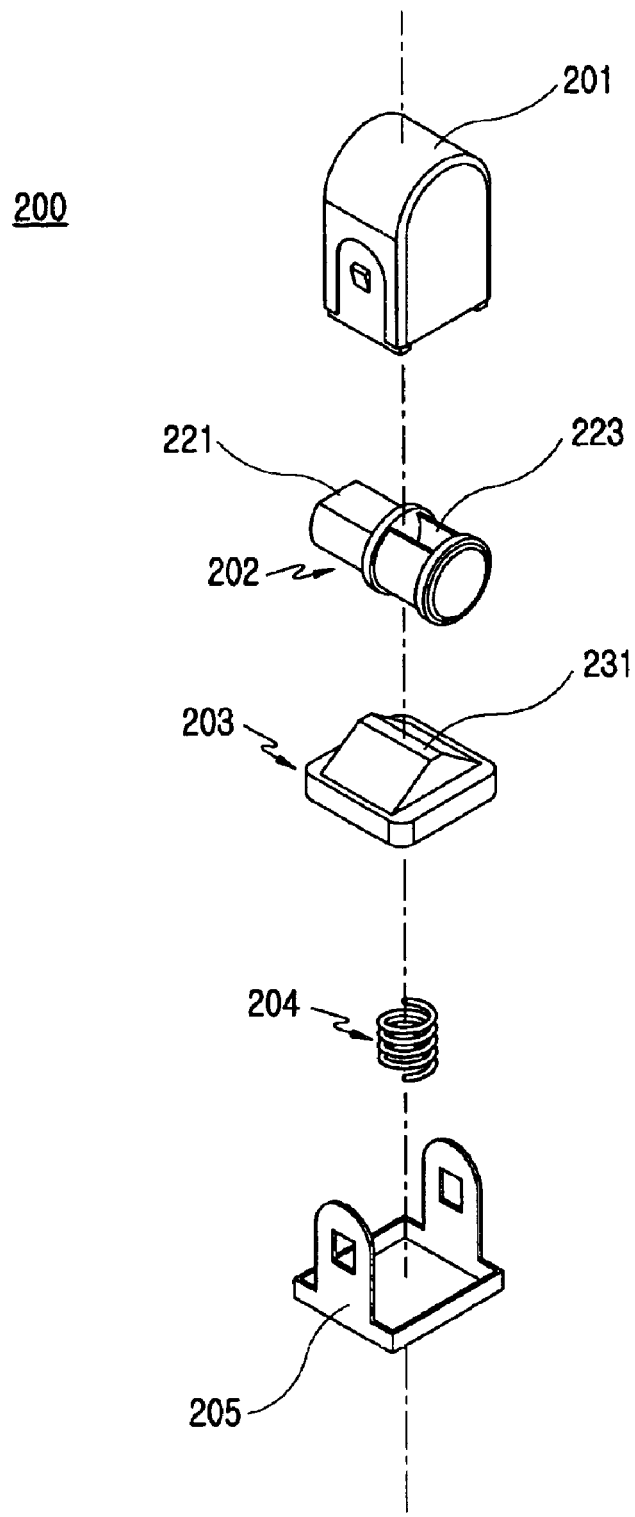
FIG. 3 is an exploded perspective view of a second hinge module shown in FIG. 1.
Figure 4:
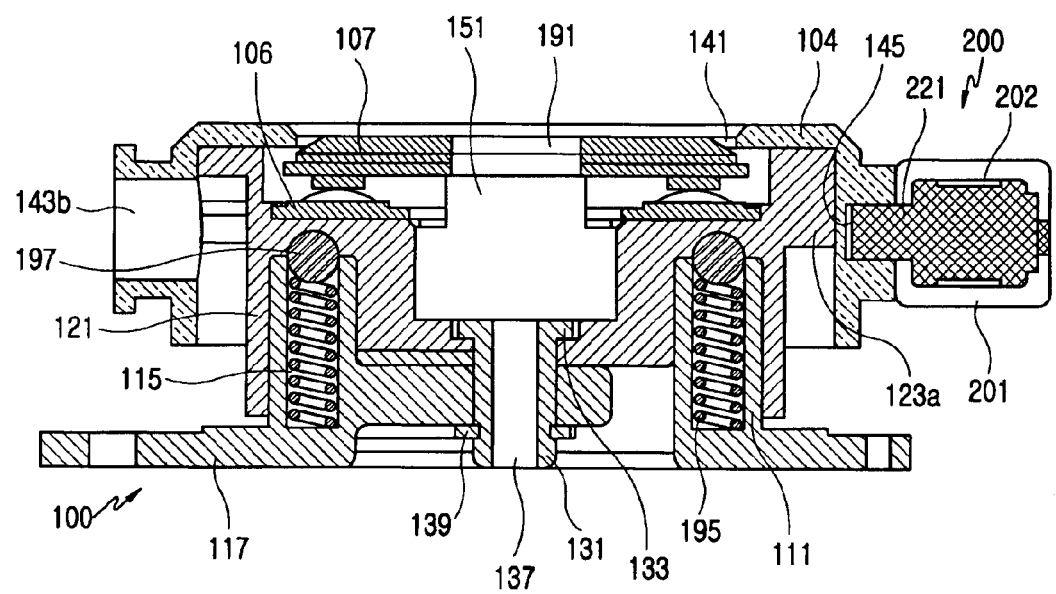
FIG. 4 is an assembled cross-sectional view of the hinge device shown in FIG. 1.
Figure 5:
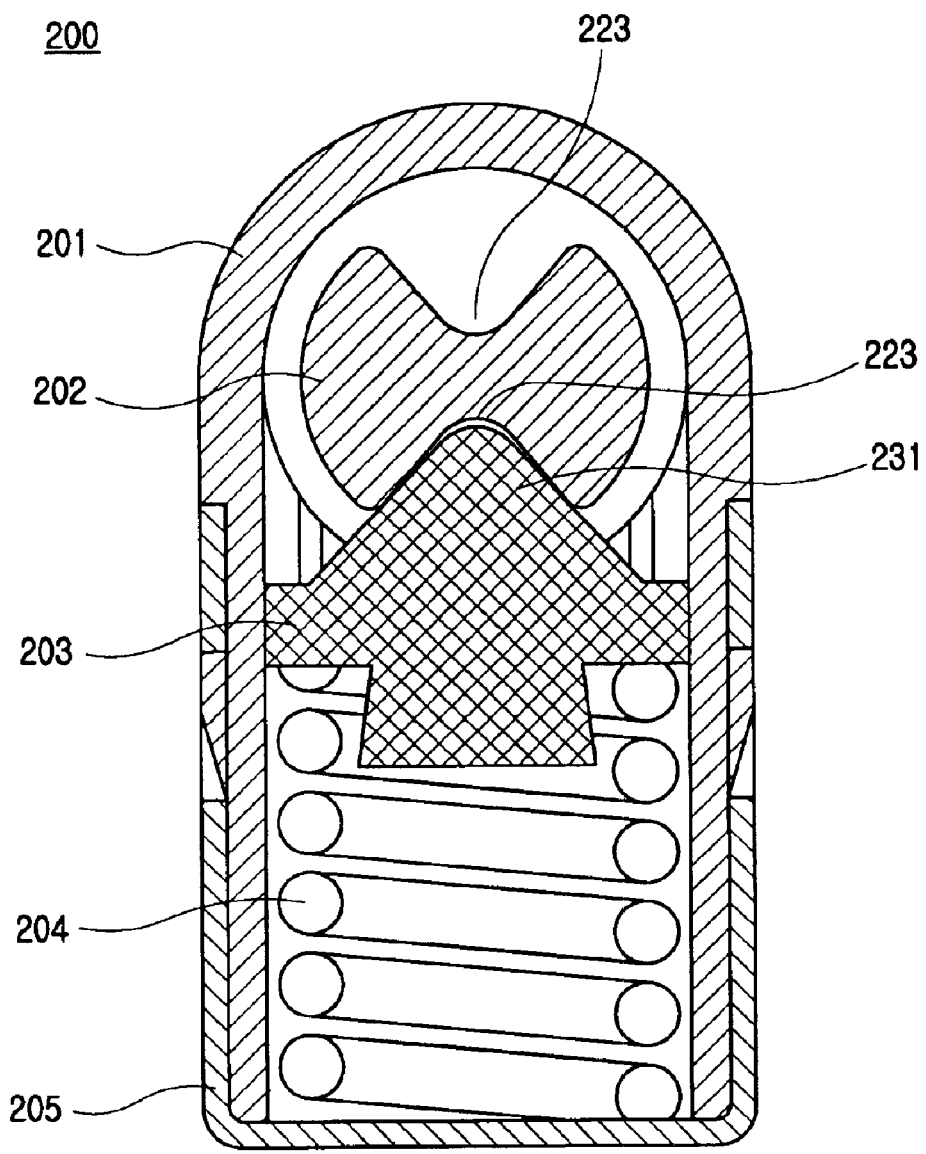
FIG. 5 is an assembled cross-sectional view of the second hinge module shown in FIG. 3.

The second hinge module 200 is accommodated in the second housing 12 so as to rotatably couple the second housing 12 to the first hinge module 100. Referring to FIGS. 1 to 3, the second hinge module 200 includes a module housing 201, a hinge shaft 202, a stopper block 203, a compression spring 204 and a cap 205.

One end of the module housing 201 is opened and a slot 211 extends longwise from the opened end of the module housing 201. The hinge shaft 202 is assembled with the module housing 201 through the slot 211.

The hinge shaft 202 is accommodated in the module housing 201 so as to rotate about the first hinge axis A1. The hinge shaft 202 is provided at one end thereof with a hinge protrusion 221, which protrudes outwardly to an outer portion of the module housing 201 through the slot 211. A stopper slot 223 extending in a direction of the first hinge axis A1 is formed in the body of the hinge shaft 202 positioned in the module housing 201. The hinge protrusion 221 is inserted into the coupling hole 145 of the rotary hinge housing 104. Preferably, at least two stopper slots 223 are formed in the same angular interval.

The stopper block 203 has a stopper protrusion 231 corresponding to the stopper slot 223 of the hinge shaft 202. The stopper block 203 presses against an outer peripheral surface of the hinge shaft 202 by receiving elastic force from the compression spring 204. When the stopper protrusion 231 matches with the stopper slot 223 of the hinge shaft 202, the rotation of the hinge shaft 202 is stopped.

The cap 205 supports one end of the compression spring 204 while closing the opened end of the module housing 201.

The second hinge module 200 is fixed to one side of the second housing 12, and the hinge protrusion 221 of the hinge shaft 202, which is rotatably accommodated in the module housing 201, is supported on one side of the rotary hinge housing 104. The hinge dummy 143a of the rotary hinge housing 104 is supported on the other side of the second housing 12 so that the second housing 12 can rotate about the first hinge axis A1.

Hereinafter, the opening/closing operation of the portable wireless terminal having the hinge device will be described with reference to FIGS. 7 to 14.

Figure 9:
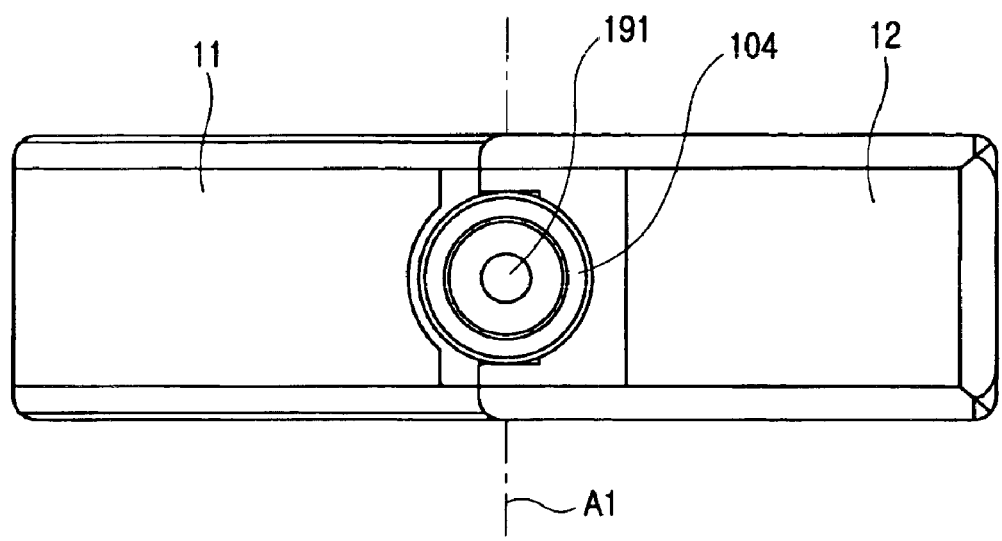
Figure 10:
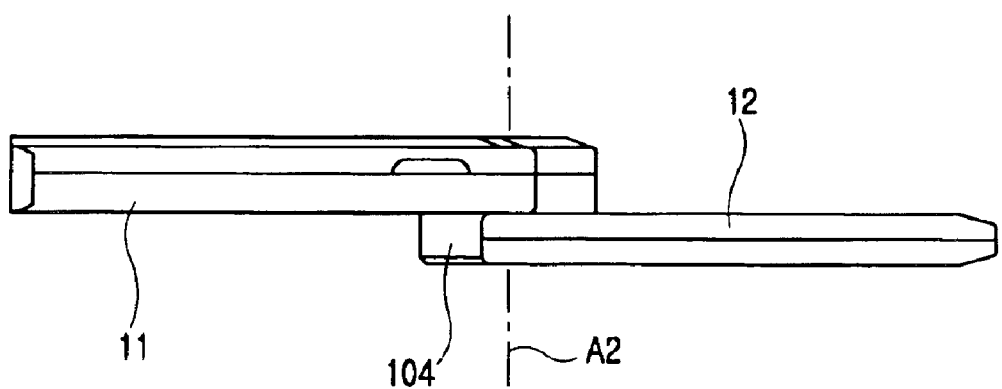

FIGS. 7 and 8 are plan and side views, respectfully, showing the first housing 11 resting on the second housing 12 in a folded position. In this state, when the second housing 12 rotates with respect to first housing 11 about the first hinge axis A1, the first and second housings 11 and 12 are positioned remote from each other as shown in FIGS. 9 and 10.

Figure 11:
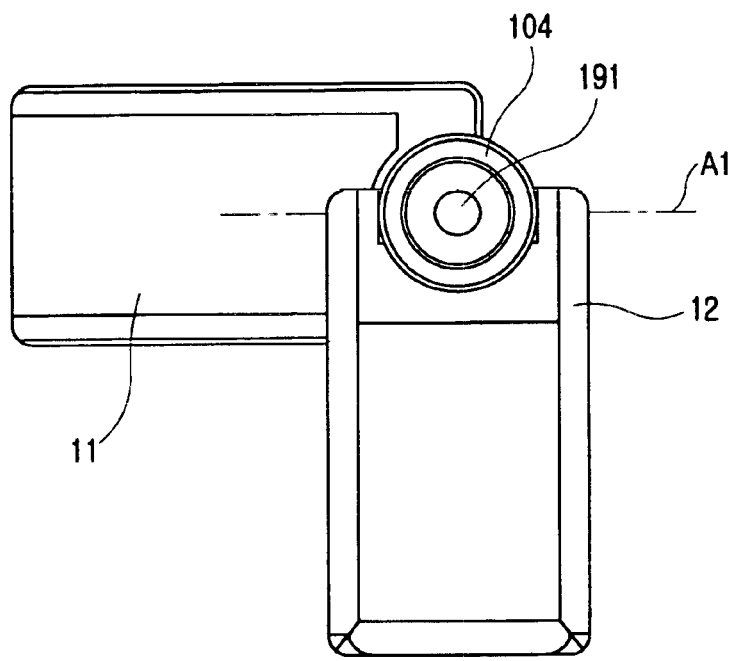

In this state, the second housing 12 rotates about the second hinge axis A2 at a right angle as shown in FIG. 11. In addition, the second housing 12 further rotates about the first hinge axis A1 at a right angle as shown in FIG. 12.

Figure 12:
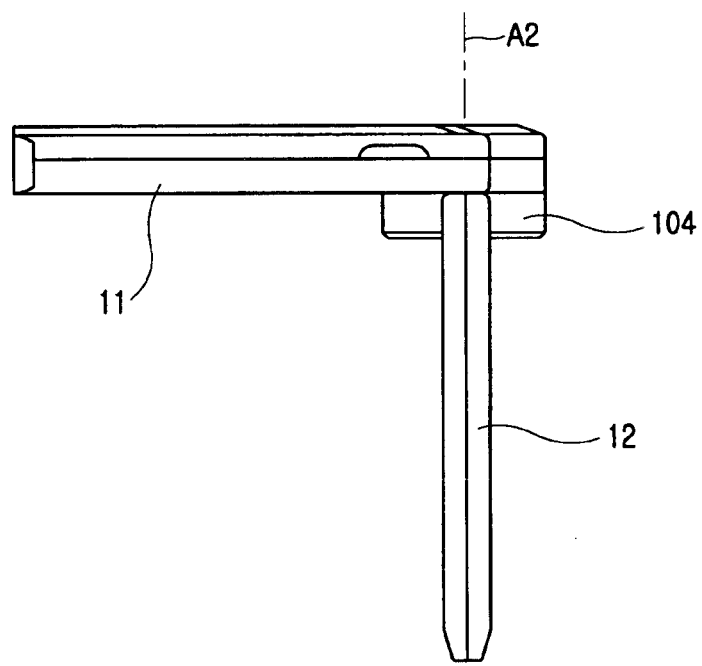
Figure 13:
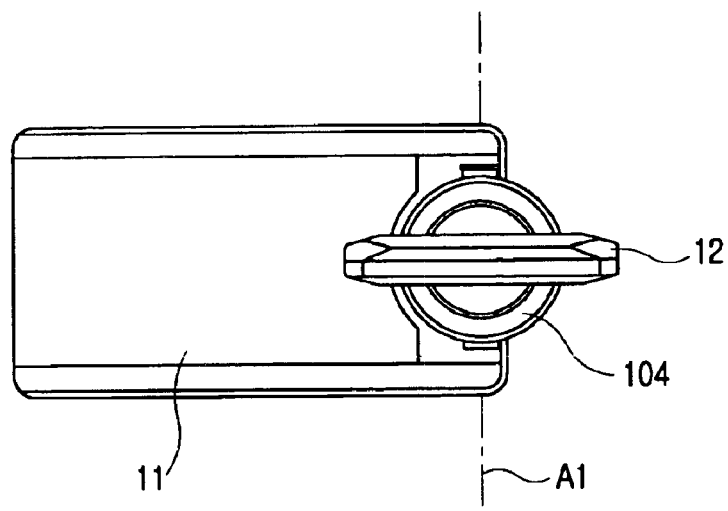
Figure 14:
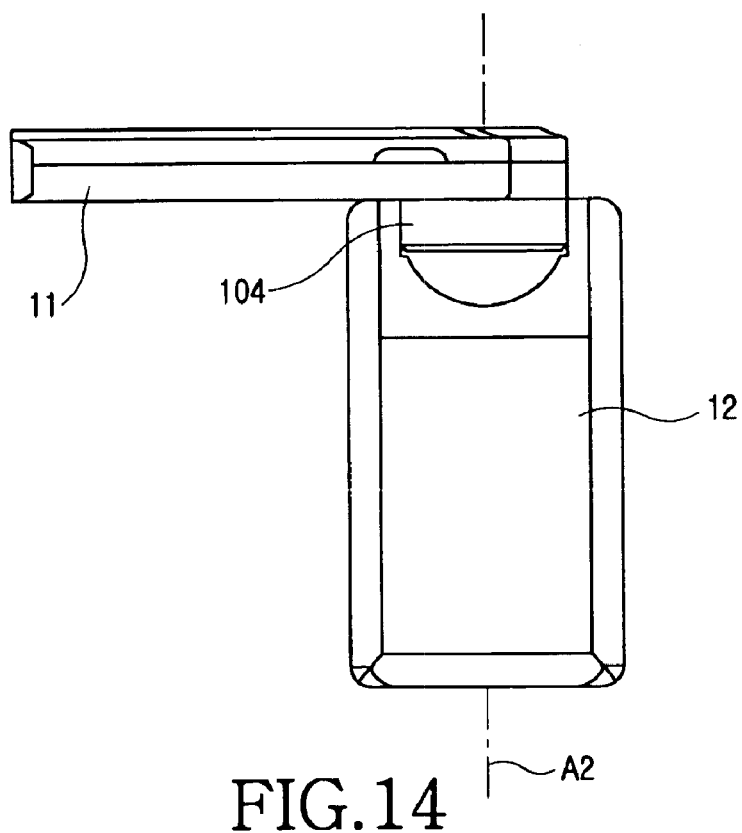

FIG. 13 shows the second housing 12 rotated at a right angle about the first hinge axis A1 from a position shown in FIG. 11, and FIG. 14 shows the second housing 12 rotated at a right angle about the second hinge axis A2 from a position shown in FIG. 12.

As shown in FIGS. 7 to 14, the second housing 12 can rotate about first and second hinge axes A1 and A2, so that the second housing 12 can be located in various angular positions with respect to the first housing 11. Although it is not illustrated, if the second housing 12 rotates about the second hinge axis A2 at a right angle from a position shown in FIG. 9, the second housing 12 rests on the first housing by turning over upper and lower surfaces thereof.

Figure 15:
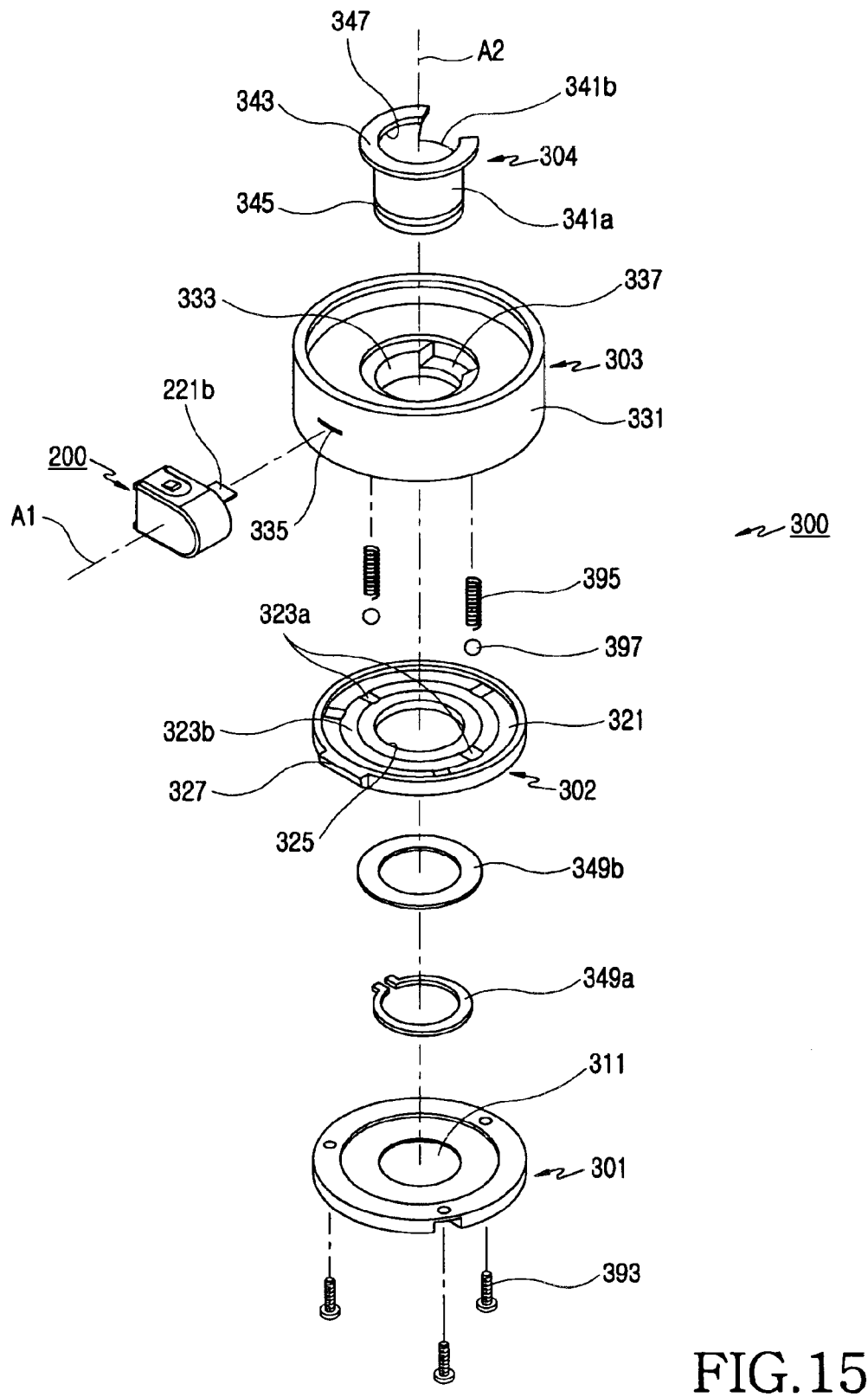
FIG. 15 is an exploded perspective view showing a hinge device of a portable wireless terminal according to a second embodiment of the present invention.
Figure 16:
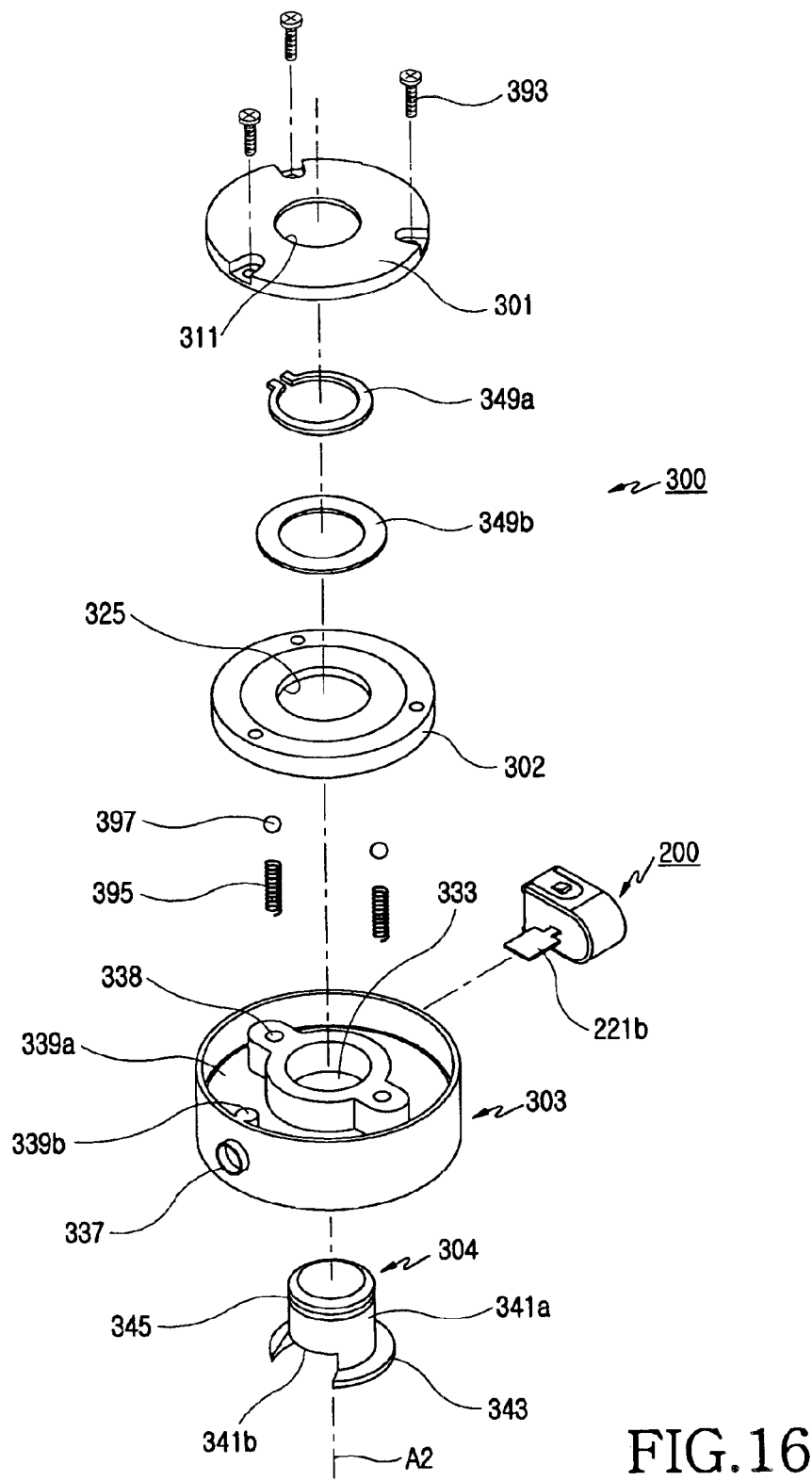
FIG. 16 is an exploded perspective view of the hinge device viewed from an inverted direction of FIG. 15.
Figure 17:
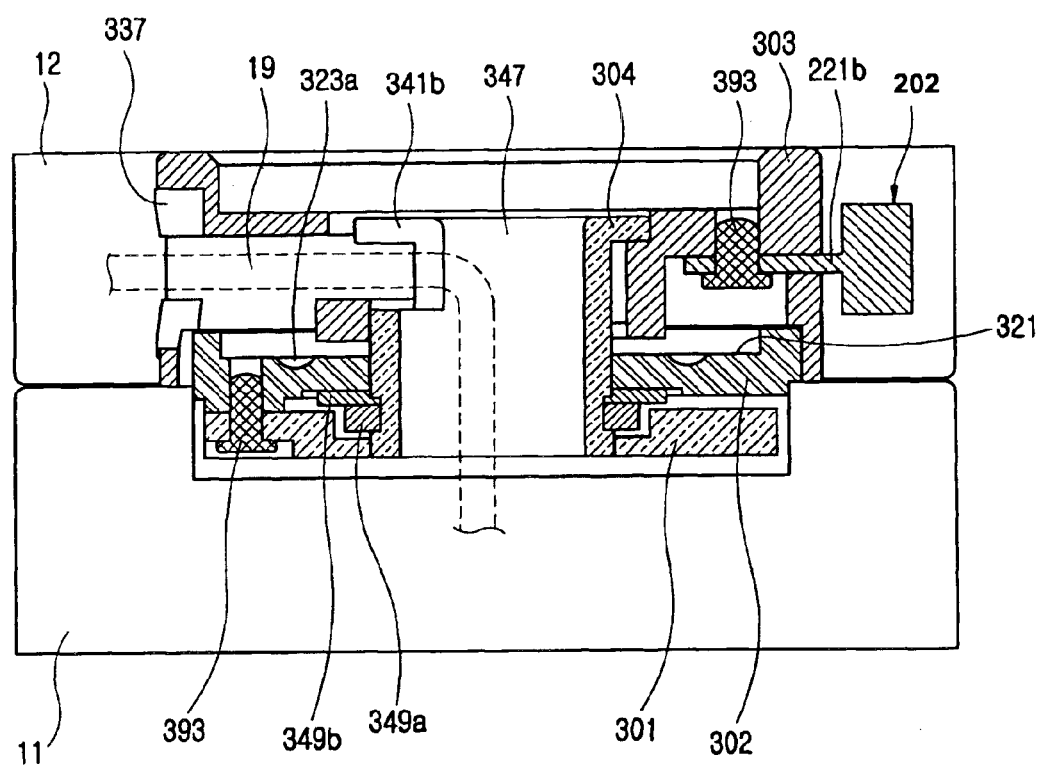
FIG. 17 is an assembled view showing the hinge device of FIG. 15 assembled into a portable wireless terminal.

FIGS. 15 and 17 are views showing a hinge device of a portable wireless terminal according to a second embodiment of the present invention. As shown in FIGS. 15 to 17, the hinge device of the portable wireless terminal according to the second embodiment of the present invention includes a first hinge module 300 providing a second hinge axis A2 extending perpendicular to an upper surface of the portable wireless terminal and the second hinge module 200 (of the first embodiment) providing a first hinge axis A1 extending parallel to the upper surface of the portable wireless terminal. The first hinge axis A1 is aligned perpendicular to the second hinge axis A2. In addition, the first hinge axis A1 is rotatable about the second hinge axis A2.

The first hinge module 300 includes a first hinge base fixed to the first housing of the portable wireless terminal, and a second hinge base 303, which is aligned in opposition to the first hinge base and rotatably coupled to the first hinge base. The first hinge base has a fixing plate 301 fixed to an inner portion of the first housing and a base plate 302 fixed to the fixing plate 301 at an outer portion of the first housing.

The fixing plate 301 and the base plate 302 have coupling holes, respectively, so that the fixing plate 301 is coupled to the base plate 302 in opposition to each other by means of screws 393, which are secured into the coupling holes, while interposing the first housing 11 therebetween. In addition, the fixing plate 301 and the base plate 302 have first perforation holes 311 and 325, respectively, which are aligned along the second hinge axis A2.

A resting surface 321 facing the second hinge base 303 is formed at one side of the base plate 302. Slots 323a having predetermined depth are formed on the resting surface 321 at the same angular interval, and a sliding groove 323b passing through the slots 323a is formed along a circumferential portion of the resting surface 321. A first protrusion 327 outwardly protrudes from an outer wall of the base plate 302.

The second hinge base 303 has a recess 339a formed at a lower end of a rotating member 331 in order to receive the base plate 302, and spring holes 338 formed in opposition to the resting surface 321. The spring holes 338 face the sliding groove 323b of the base plate 302. Balls 397, which appear or disappear according to the elastic force of compression springs 395, are mounted on ends of the spring holes 338. Therefore, when the second hinge base 303 rotates, the balls 397 slidably move along the sliding groove 323b due to elastic force of the compression springs 395 applied thereto. The rotation of the second hinge base 303 is stopped as the balls 397 engage the slots 323a formed on the base plate 302. The recess 339a is formed at a sidewall thereof with a second protrusion 339b coupled to the first protrusion 327. A rotational range of the second hinge base 303 is limited due to a mechanical coupling between the first and second protrusions 327 and 339b.

The second hinge base 303 has a second perforation hole 333 extending in a direction of the second hinge axis A2 and aligned with first perforation holes 311 and 325. In addition, the second hinge base 303 is formed at an outer peripheral portion thereof with a coupling hole 335 and a dummy hole 337 for receiving the second hinge module 200. The coupling hole 335 and the dummy hole 337 are formed along the first hinge axis A1. The dummy hole 337 extends from an outer peripheral surface of the second hinge base 303 to the second perforation hole 333. In short, according to second embodiment of the present invention, the second hinge base and the rotary hinge housing described in the first embodiment of the present invention are integrally formed with each other.

The second hinge base 303 is rotatably coupled to the base plate 302 by means of a hinge coupler 304.

The hinge coupler 304 includes a flange 343 installed on an upper end of the second hinge base 303, a supporting shaft 341a protruding from the flange 343 in a direction of the second hinge axis A2 and extending beyond the first and second perforation holes 311, 325 and 333, and a coupling slot 345 formed along an outer circumferential portion of the supporting shaft 341a. The supporting shaft 341a has a guide hole 347 extending in a direction of the second hinge axis A2. The supporting shaft 341a communicates with the dummy hole 337 of the second hinge base 303 through a slot 341b formed at one end of the supporting shaft 341a. A flexible printed circuit 19 (FIG. 17) can be installed in the portable wireless terminal through the guide hole 347, the slot 341b, and the dummy hole 337.

The coupling slot 345 is coupled with a snap ring 349a at a lower end of the first hinge base at a lower end of the base plate 302, so that the first hinge base is rotatably coupled to the second hinge base 303 through the hinge coupler 304. A washer 349b is interposed between the base plate 302 and the snap ring 349b so as to facilitate the rotation of base plate 302 while preventing the base plate 302 from being worn. Since the second hinge base 303 is coupled to the base plate 302 by means of the hinge coupler 304, the first hinge module 300 provides the second hinge axis A2 extending perpendicular to the upper surface of the first housing of the portable wireless terminal.

The second hinge module 200 has a structure similar to a structure of the second hinge module of the first embodiment, except for a hinge protrusion 221b coupled to the second hinge base 303 and having a plate shape. Referring to FIG. 17, the hinge protrusion 221b is securely fixed to an inner portion of the second hinge base 303 by means of a screw 393.

As described above, the hinge device of the portable wireless terminal according to the present invention includes a first hinge axis extending parallel to the upper surface of the first housing and a second hinge axis extending perpendicular to the upper surface of the first housing to provide a rotational center for the first hinge axis, so the second housing coupled to the first housing can be rotated about two hinge axes. Accordingly, the second housing can be located in various positions with respect to the first housing. For example, the second housing can rest on the first housing by turning over upper and lower surface of the second housing. In addition, the hinge device of the portable wireless terminal according to the present invention allows the second housing to be opened/closed in various manners, thereby improving convenience of use. Accordingly, the portable wireless terminal having the hinge device of the present invention can satisfy various tastes of users.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A hinge device of a portable wireless terminal which includes a first housing and a second housing, the terminal having a first hinge axis extending parallel to an upper surface of the first housing, the second housing being coupled to the first housing in such a manner that the second housing is moveable towards and away from the first housing about the first hinge axis, the terminal further having a second hinge axis extending perpendicular to the upper surface of the first housing, the second hinge axis providing a rotational center for the first hinge axis, the first and second hinge axes acting as rotational axes of the second housing when the second housing rotates with respect to the first housing, the binge device comprising:
   a first hinge module including a first hinge base fixedly coupled to the first housing, and a second hinge base rotatably coupled to the first hinge base in opposition to the first hinge base so as to be rotated about the second hinge axis, and a cylindrical rotary hinge housing fixed to an inner portion of the second hinge base; and
   a second hinge module fixed to the second housing, connected to the second hinge base through the cylindrical rotary hinge housing and connecting the second housing to the second hinge base in order to allow the second housing to rotate about the first hinge axis.

2. The hinge device as claimed in claim 1, wherein the second hinge module includes a module housing fixed in the second housing, a hinge shaft accommodated in the module housing so as to rotate about the first hinge axis and having a hinge protrusion protruding towards a side of the module housing so as to be connected to the second hinge base, and a stopper block accommodated in the module housing in order to press against one side of the hinge shaft by receiving predetermined elastic force.

3. The hinge device as claimed in claim 2, wherein the hinge shaft is formed at an outer peripheral surface thereof with at least two stopper slots and the stopper block is provided with a stopper protrusion, which is selectively inserted into the stopper slot as the hinge shaft rotates.

4. The hinge device as claimed in claim 1, wherein the first hinge base has a cylindrical shape extending in a second hinge axis direction and is formed at a center thereof with a first perforation hole extending in the second hinge axis direction, the second hinge base having a cylindrical shape extending in the second hinge axis direction and is formed at a center thereof with a second and third perforation holes, and the first hinge module includes hinge coupler having a flange supported on an upper end of the second hinge base and a supporting shaft protruding from the flange and extending to a lower end of the first hinge base by passing through the first to third perforation holes, and a snap ring coupled with a coupling slot of the supporting shaft at the lower end of the first hinge base.

5. The hinge device as claimed in claim 4, wherein the flange is integrally formed with the second hinge base.

6. The hinge device as claimed in claim 4, wherein the hinge coupler includes a guide hole extending in the second hinge axis direction and formed through a center of the supporting shaft.

7. The hinge device as claimed in claim 1, further comprising at least one spring hole formed on an upper circumferential portion of the first hinge base at a same angular interval, at least one ball exposed at an upper end of the spring hole by receiving elastic force from a compression spring accommodated in the spring hole, and at least one slot formed at an inner upper end of the second hinge base along a circumferential surface of the second hinge base at a same angular interval so as to selectively engage with the ball.

8. The hinge device-as claimed in claim 7, wherein a sliding groove is formed at an upper inner portion of the second hinge base along a rotating route of the ball.

9. The hinge device as claimed in claim 1, further comprising at least one spring hole formed on an lower circumferential portion of the second hinge base at a same angular interval, at least one ball exposed at an upper end of the spring hole by receiving elastic force from a compression spring accommodated in the spring hole, and at least one slot formed at an inner lower end of the first hinge base along a circumferential surface of the first hinge base at a same angular interval so as to selectively engage with the ball.

10. The hinge device as claimed in claim 1, further comprising a receiving groove formed on an upper end of the second hinge base, a camera lens accommodated in a lower portion of the receiving groove, a switch pad accommodated in the receiving groove above the camera lens, formed at a center thereof with a first opening for exposing the camera lens, and having at least one pair of dome switches, which are symmetrically aligned to each other, and a key button installed at an upper end of the receiving groove in order to operate the dome switches and formed with a second opening for exposing the camera lens.

11. The hinge device as claimed in claim 10, wherein the first hinge module includes a cylindrical rotary hinge housing, the cylindrical rotary hinge housing exposes the key pad to an upper surface of the cylindrical rotary hinge housing, and the second hinge base is fixed to an inner portion of the cylindrical rotary hinge housing.

12. The hinge device as claimed in claim 1, wherein the first hinge base includes a fixing plate fixed to the first housing and a base plate fixed to the fixing plate and having a resting surface facing a lower end of the second hinge base.

13. The hinge device as claimed in claim 12, wherein a first perforation hole is formed through the fixing plate and the base plate of the first hinge base, the second hinge base has a cylindrical shape extending in the second hinge axis direction and is formed at a center thereof with a second perforation hole coaxially aligned with the first perforation hole in the second hinge axis direction, and the first hinge module includes a hinge coupler having a flange supported on an upper end of the second hinge base and a supporting shaft protruding from the flange, extending between the fixing plate and the base plate and having a coupling slot along an outer circumferential portion thereof, and a snap ring coupled with the coupling slot of the supporting shaft at a lower end of the base plate.

14. The hinge device as claimed in claim 12, further comprising at least one spring hole formed on an lower circumferential portion of the second hinge base at a same angular interval, at least one ball exposed at an upper end of the spring hole by receiving elastic force from a compression spring accommodated in the spring hole, and at least one slot formed at the resting surface of the base plate along a circumferential portion of the resting surface at a same angular interval so as to selectively engage with the ball.

15. The hinge device as claimed in claim 12, further comprising a recess formed at a lower end of the second hinge base in order to rotatably receive the base plate, a first protrusion protruding from an outer peripheral portion of the base plate, and a second protrusion formed at a sidewall of the recess so as to engage with the first protrusion when the second hinge base rotates, thereby limiting a rotational range of the second hinge base.

16. The hinge device as claimed in claim 12, wherein the second hinge base is formed at an outer peripheral portion thereof with a coupling hole, which acts as a coupling means with respect to the second hinge module.

* * * * *